Nov. 16, 1971   J. D. MAXWELL   3,619,932
WEIGHT RELEASE MECHANISM
Filed March 17, 1970

INVENTOR
JAMES D. MAXWELL
By Eugene M. Eckelman
ATTORNEY

United States Patent Office 3,619,932
Patented Nov. 16, 1971

3,619,932
WEIGHT RELEASE MECHANISM
James D. Maxwell, 11001 SE. 19th St.,
Vancouver, Wash. 98664
Filed Mar. 17, 1970, Ser. No. 20,226
Int. Cl. A01k 91/04
U.S. Cl. 43—43.12
6 Claims

ABSTRACT OF THE DISCLOSURE

A weight release mechanism includes a tubular body portion and end enclosures through which a wire-like shank slidably extends. The shank has opposite ends projecting from the body portion one of such ends being arranged to be connected to a pole line and the other end to a fish line. The shank has an offset parallel finger which extends interiorly of the body portion and operates in the area of a window provided in the body portion. Such finger is arranged to engage the end loop of a weight line. The shank is formed of a spring wire or the like and has spring convolutions formed directly therein which provide elongation of the shank to the extent that the weight release finger is movable out of the plane of the window to release the weight, such action occurring when a large fish is hooked and also when the weight becomes snagged.

BACKGROUND OF THE INVENTION

This invention relates to new and useful improvements in weight release mechanism for fishing tackle.

Considerable fishing tackle and fish are lost because of the presence of the weight which is required as a part of the tackle. That is, in fishing in fast water, for example, it is necessary to use a substantially large weight to get the bait to an area adjacent the bottom of the river. Since the weight must be retrieved along with the fish, it often is instrumental in the loss of the fish because the fish in pulling the weight has some solid weight to jerk against and often pulls the hook from his mouth. Also, in the art of fishing, it is often desirable to move the weight along the bottom of the river. Such causes the weight often to become snagged whereby considerable tackle is lost when the line is broken. Prior art devices have been used for releasing the weight from the line but such devices are not satisfactory in operation, particularly under heavy load.

SUMMARY OF THE INVENTION

An important objective of the persent invention is to provide mechanism which overcomes the disadvantages enumerated above, namely, a weight release mechanism which operates to free the weight from the tackle in the event that a fish is hooked or also in the event that the weight is snagged.

A more particular object of the present invention is to provide a weight release mechanism of the type described which employs a tubular body portion in which a wire-like shank is slidably mounted, and including a novel feature wherein the shank has an integral offset finger which operates in the area of a window in the body portion for holding and releasing the weight under certain conditions, the shank being formed from a spring-like wire wherein elongation of the shank to provide operation of the finger relative to the window is accomplished by spring coils formed directly in the shank.

Another object is to provide a weight release mechanism of the type described which is foolproof in operation and inexpensive to manufacture.

The invention will be better understood and additional objects and advantages will become apparent from the following description taken in connection with the accompanying drawings which illustrate a preferred form of the device.

DETAILED DESCRIPTION OF A PREFERRED EMBODIMENT

Figure 1:
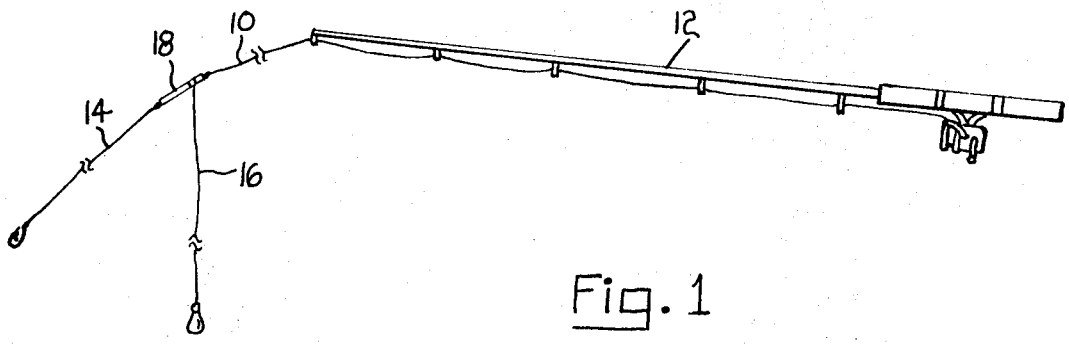
FIG. 1 is an elevational view of a fishing tackle set-up using the present weight release mechanism therein.
Figure 2:
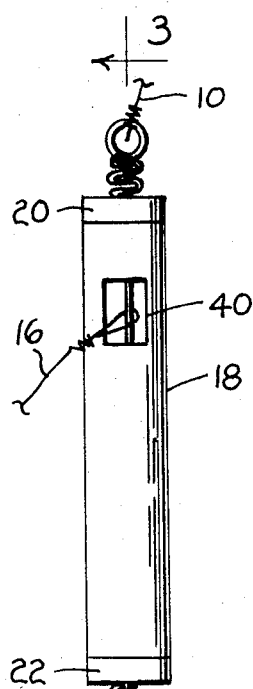
FIG. 2 is an elevational view, enlarged relative to FIG. 1, of the weight release mechanism.
Figure 3:
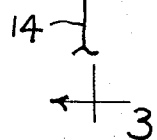
FIG. 3 is an enlarged sectional view taken on the line 3—3 of FIG. 2.
Figure 3:
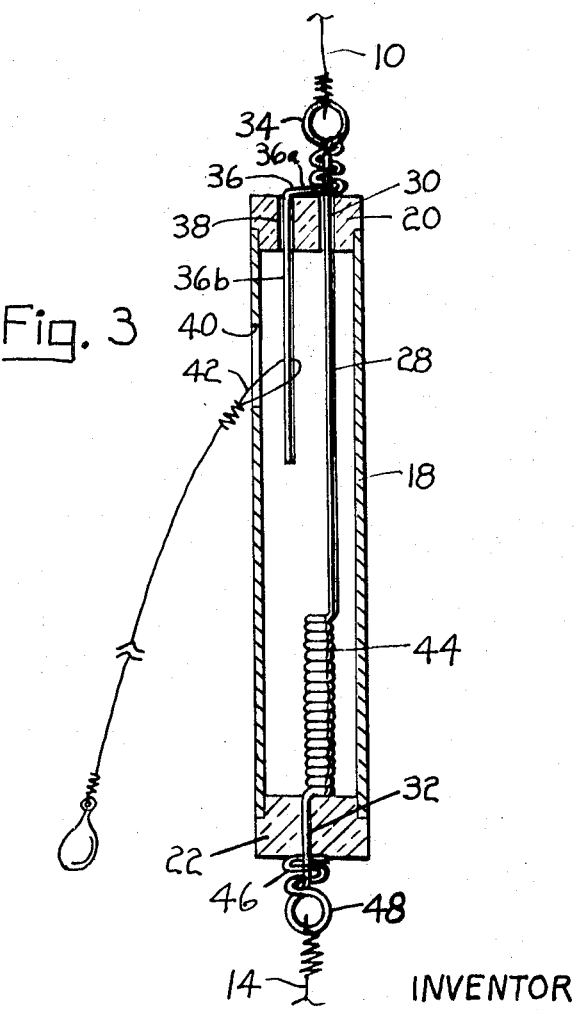

Referring in particular to the drawings and first to FIG. 1, the invention is intended for connection to a line 10 leading from a fish pole 12. It is desirable that it be connected between the pole line 10 and a hook line 14 and that it carry a weight line 16 so that if the weight should become snagged or if a large fish should be hooked the weight line 16 will be released, thus separating the weight from the rest of the tackle.

The present weight release mechanism is designated by the numeral 18 and comprises a tubular body portion or housing having end closures or plugs 20 and 22. Preferably, for economy of manufacture and to provide a lightweight structure, the plugs 20 and 22 are formed of plastic. These end closures fit snugly within the tubular body 18 and have an end flange which abuts against the ends of the tubular body 18. It is desired that an integral connection be provided between the end closures and the tubular body portion 18, and for this purpose they are adhesively secured together, it being desirable that a substantially permanent type connection be provided between these members so that in no event will they separate even under the worst of use conditions.

The operating portion of the weight release mechanism comprises a wire-like shank 28 which projects slidably through an aperture 30 in the end plug 20 and which also projects through an aperture 32 in the end plug 22.

The end of the shank 28 toward the pole end is formed into an eye 34, and leading from the shank portion between the eye and the end closure 20 is a weight release finger 36. This weight release finger 36 comprises a portion 36a which leads integrally at right angles from the shank 28 and an angled portion 36b which leads at right angles from portion 36a in parallel relation with the shank 28. The portion 36b of the weight release finger extends slidably through an aperture 38 in the end closure 20.

The weight release finger portion 36b extends interiorly past a window 40 provided in the side wall of the body portion 18 and is of a length such that a loop 42 on the weight line 16 can be held thereon and thus connected to the housing portion of the mechanism. The shank portion 28 is formed of a spring wire material and has a helical tension spring portion 44 formed in its length which is disposed within the body portion 18. The spring portion 44 of the shank permits the length of the overall shaft to be increased to an extent such that the finger 36b can move axially in a direction away from the fish line end to a point where it releases the loop 42 of the weight line.

It is preferred that the convolutions 44 in the shank 28 be formed to terminate at the end closure 22 and that the wrappings 46 forming an eye 48 in the shank 28 at the hook line end abut against the outer end of such end closure. In addition, the portion of shank 28 which passes through end closure 22 has a snug fit in aperture 32. The shank will thus have no axial movement at the fish line end of the body portion, and the arrangement described provides a solid connection of the one end for proper operation of the spring portion and weight release finger 36.

According to the present invention, the shank 28 will be expanded, by means of its spring portion 44, to release the weight when a fish takes the hook. Thus, when a fish is hooked the weight will become released from the main tackle and will not interfere with bringing in the fish. Also, if the weight should become snagged, the body portion 18 will be anchored to the extent that upon sufficient pull on the pole line the shank will become expanded to release the weight and only the latter will be lost.

An important feature of applicant's invention resides in its construction wherein the shank is formed of an inexpensive wire-like material and the spring portion thereof which permits its elonagtion is formed directly therein. Furthermore, the entire line hooking means of the weight release mecanism is formed of a single piece of wire wherein the spring finger 36 comprises an extended end from formation of the eye 34 and suitably bent to project through the aperture 38. As stated above, the end closures 20 and 22 are adhesively secured to the body portion 18 in a permanent type connection, thus eliminating the possibility of the weight release parts from separating when a fish is being landed.

It is to be understood that the form of my invention herein shown and described is to be taken as a preferred example of the same and that various changes in the shape, size and arrangement of parts may be resorted to without departing from the spirit of my invention.

Having thus described my invention, I claim:

1. A weight release mechanism for a fish line assembly having a pole line and hook line, comprising:
   (a) a tubular body portion having a defining wall and end closures on said wall portion,
   (b) means in said body portion defining a window,
   (c) a wire-like shank projecting longitudinally through said body portion and said end closures,
   (d) said shank at one projecting end being arranged to be connected to a pole line and at its other projecting end being arranged to be connected to a hook line, thus providing a direct connection between the pole line and the fish line,
   (e) said shank being formed of a spring-like material and having a helical tension spring formed directly therein whereby to be expandable lengthwise,
   (f) said shank at the pole end of the body portion slidably extending through the respective end closure,
   (g) and a weight release finger extending integrally from said shank at a point between the spring convolutions and the connection with the pole line,
   (h) said weight release finger extending past said window for engaging the loop of a weight line extending through said window and being arranged upon expansion lengthwise of said shank to pull out of the loop of the weight line.

2. The weight release mechanism of claim 1 wherein said weight release finger comprises an integral end extension from said shank.

3. The weight release mechanism of claim 1 wherein:
   (a) said shank has end eyes formed therein for connection to the pole line and fish line,
   (b) said weight release finger comprising an integral end extension from the end eye at the pole end of the body portion.

4. The weight release mechanism of claim 1 wherein:
   (a) said end closure at the pole line end thereof has an aperture extending longitudinally of said body portion on a side adjacent said window,
   (b) said weight release finger having a first portion extending angularly from said shank and a second portion extending angularly from said first portion through said aperture in substantially parallel relation with said shank.

5. The weight release mechanism of claim 1 wherein:
   (a) said end closure at the pole line end thereof has an aperture extending longitudinally of said body portion on a side adjacent said window,
   (b) said shank having end eyes formed therein for connection to the pole line and fish line,
   (c) said weight release finger comprising an integral end extension from the end eye at the pole line end of the body portion
   (d) said weight release finger having a first portion extending angularly from said shank and a second portion extending angularly from said first portion through said aperture in substantially parallel relation with said shank.

6. The weight release mechanism of claim 1 wherein said end closures comprise independent members from said tubular housing but are securely fixed in place in said tubular housing during assembly of the weight release mechanism to the extent to prevent the weight release parts from separating under a heavy load.

References Cited

UNITED STATES PATENTS 2,488,475  11/1949  Merritt _____ 43—43.12
3,057,108  10/1962  Jacobsen _____ 43—43.12

WARNER H. CAMP, Primary Examiner

U.S. Cl. X.R.

43—42.72